April 14, 1959 — F. A. PERRINO — 2,881,879
ACCELERATOR BRAKE CONTROL
Filed March 15, 1956 — 5 Sheets-Sheet 1

INVENTOR.
FRANK ANTHONY PERRINO
BY
*William Frederick Werner*
ATTORNEY

INVENTOR.
FRANK ANTHONY PERRINO

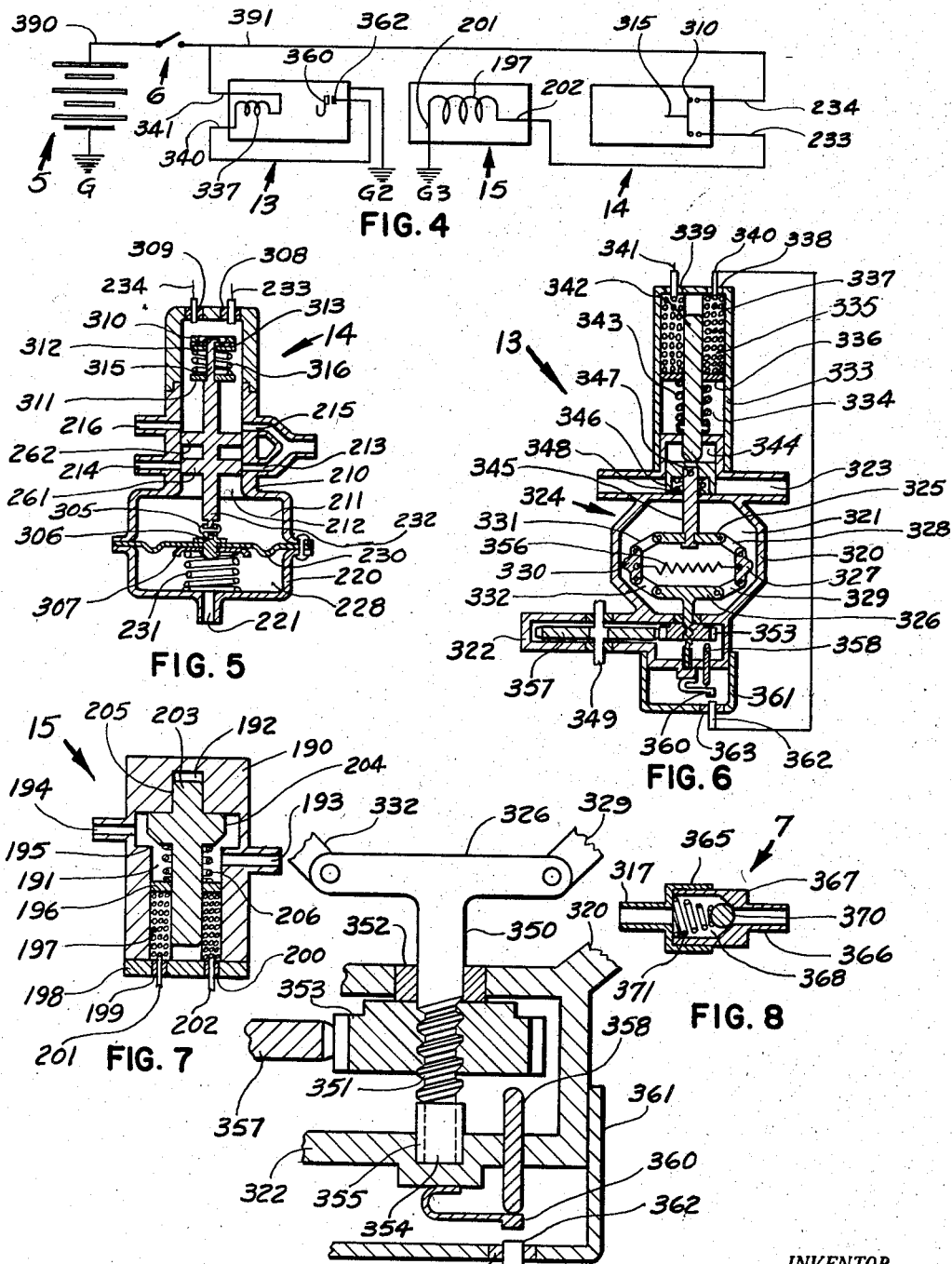

United States Patent Office 2,881,879
Patented Apr. 14, 1959

2,881,879

ACCELERATOR BRAKE CONTROL

Frank Anthony Perrino, North Providence, R.I.

Application March 15, 1956, Serial No. 571,734

22 Claims. (Cl. 192—3)

This invention relates to a power braking mechanism for motor vehicles and more particularly to a power braking mechanism under control of the accelerator pedal.

One of the objects of the present invention is to provide a power braking mechanism for motor vehicles which is under control of the accelerator pedal.

Another object of the present invention is to eliminate the conventional braking pedal on a motor vehicle and have the braking pedal function under control of the accelerator pedal.

Another object of the present invention is to provide an accelerator brake control which reduces the time interval between sensing the necessity for applying brakes and actually applying the brakes on a motor vehicle.

And still another object of the present invention is to provide an accelerator brake control with mechanism operating as an anti-skid device.

And still another object of the present invention is to provide an accelerator brake control with an emergency source of vacuum power.

And still another object of the present invention is to provide an accelerator brake control which may be operated in conjunction with the normal power brake pedal.

With these and other objects in view, the invention consists of certain novel features of construction which will be more fully described and particularly pointed out in the following specification and claims.

Like reference numerals refer to like parts in the accompanying drawings in which:

Figure 4 is a wiring diagram pertinent to the mechanism shown in Figure 3.

Figure 5 is a transverse cross-sectional view of the emergency valve.

Figure 6 is a transverse cross-sectional view of the anti-skid device.

Figure 7 is a transverse cross-sectional view of the solenoid check valve.

Figure 8 is a transverse cross-sectional view of the check valve.

Figure 9 is an enlarged fragmentary transverse cross-sectional view of one end of the anti-skid device shown in Figure 6.

The present invention is adaptable to the conventional motor vehicle having hydraulic brakes and a fluid drive transmission.

Figure 1:
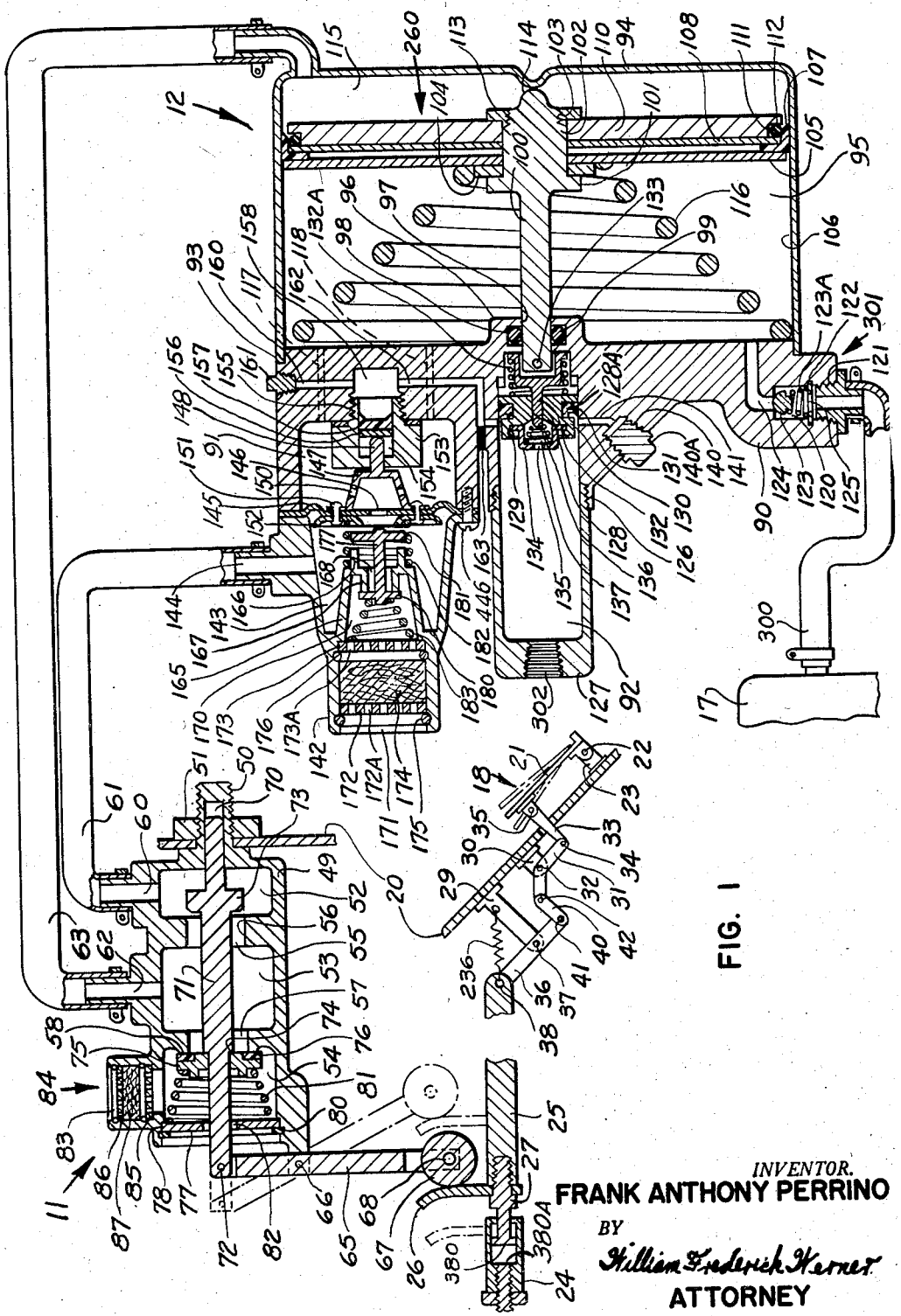
Figure 1 is a transverse sectional view of the accelerator brake control showing the power braking mechanism in neutral position.

The present invention as illustrated in Figure 1 shows a control valve 11, a power unit 12, an engine manifold 17 and an accelerator or gas pedal 18.

The control valve 11 and power unit 12 are shown with the movable parts in position when the motor vehicle is underway and the power brakes are inoperative.

Figure 2:
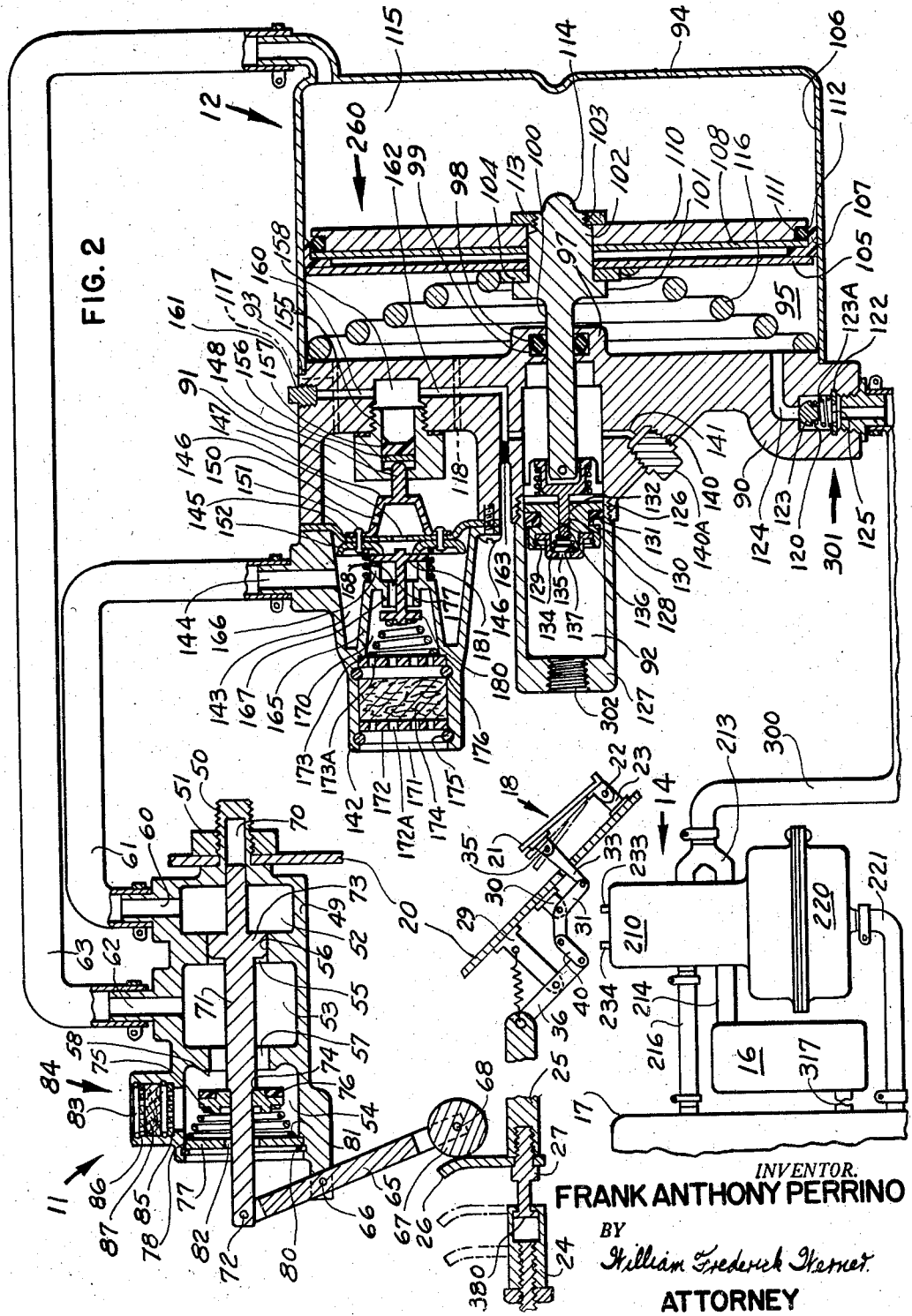
Figure 2 is a view similar to Figure 1 showing the power braking mechanism in actuated position as when the brakes are applied; with a vacuum supply tank and an emergency valve added to the mechanism of Figure 1.

Figure 2 illustrates the moving parts of control valve 11 and power unit 12 in position when the power brakes are in applied or operative position. In addition Figure 2 shows the added feature of an emergency valve 14 and a vacuum supply tank 16 added to the new and improved power braking mechanism illustrated in Figure 1.

Figure 3:
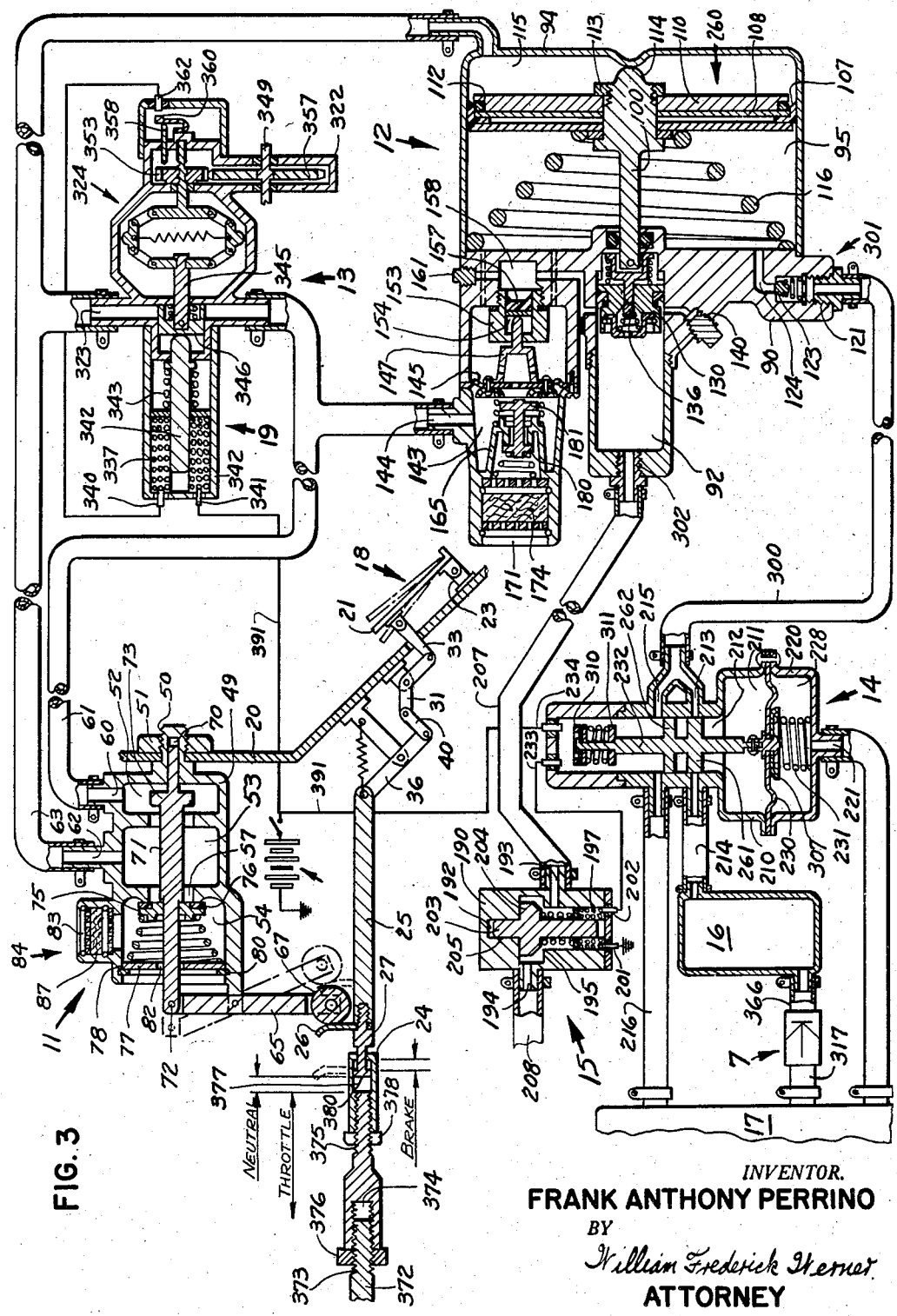
Figure 3 is a transverse cross-sectional view of a modified form of accelerator brake control showing safety features added to the mechanisms shown in Figures 1 and 2.

Figure 3 illustrates additional safety operating features added to the new and improved power braking mechanism illustrated in Figures 1 and 2 consisting of an anti-skid unit 13, a solenoid check valve 15 and a solenoid 19 operatively connected to the anti-skid unit 13.

The floor board 20 of a conventional motor car is shown in Figures 1, 2 and 3. Accelerator pedal 21 is pivotally mounted at 22 to a bracket 23 which is fixed to floor board 20. The control sleeve leading to the carburetor is shown at 24. An intermediate link 25 provided with a flange 26 is connected to control sleeve 24 by means of stud 27.

A bracket 30 is fixed to floor board 20. A lever 31 is pivotally mounted at 32 to bracket 30. A link 33 is pivotally connected at 34 to lever 31 and is also pivotally connected at 35 to accelerator pedal 21. A toggle linkage consists of a lever 36 pivotally mounted at 37 to bracket 29 fixed to floor board 20 and is pivotally connected at 38 to intermediate link 25. A lever 40 is pivotally mounted at 41 to lever 36 and is pivotally mounted at 42 to lever 31.

It will be noted that when a driver's foot depresses accelerator pedal 21 it will pivot lever 31 through link 33 to pivot lever 36 through lever 40 to push intermediate link 25 forward so that control sleeve 24 will allow more gas to be fed from the carburetor and thereby cause the motor car to move forward from a neutral, standing or idling position. Flange 26 is moved from the full line position to the forward or left hand dot and dash position shown in Figure 1.

Referring to Figures 1, 2 and 3 and especially to Figure 1, control valve 11 consists of a housing 49 secured to floor board 20 by means of a threaded end 50 and a nut 51. The housing is provided with three chambers 52, 53 and 54 interconnected by means of port 55 having a valve seat 56 and port 57 having a valve seat 58. A port 60 connects chamber 52 with a conduit 61. A port 62 connects chamber 53 with a conduit 63. A lever 65 pivotally connected at 66 to housing 49 has a disk 67 rotatably mounted at 68. Internally, threaded end 50 is provided with a bearing 70.

A piston 71 pivotally connected at 72 to lever 65 on one end is slidably mounted in bearing 70 on its opposite end. Piston 71 is provided with a valve flange 73 and a shoulder 74. A collar 75 is slidably mounted on piston 71 and has a washer of packing material 76 fixed to one side. A plug 77 is secured in one end of chamber 54 by means of a recess 78 in housing 49 and a snap ring 80. A spring 81 is interposed between collar 75 and plug 77. A clearance hole 82 in plug 77 permits piston 71 to slide therethrough. A port 83 in housing 49 connects chamber 54 with the atmosphere. An air filter 84 is fixed in port 83. It consists of two plates 85 and 86 each provided with a plurality of orifices. Wire mesh 87 is placed between plates 85, 86 which are secured in housing 49.

Power unit 12 consists of a housing 90 having a hydraulic cylinder 92 and a secondary vacuum chamber 91.

Housing 90 is provided with a rim 93. A cover 94 is secured to rim 93. Housing 90 is provided with a boss 96 having a bearing 97. A circular groove 98 located in bearing 97 retains an O ring 99. A piston rod 100 provided with a flange 101, an enlarge portion 102 and a thread 103 is slidably mounted in bearing 97 and passes through O ring 99. A washer 104 abuts flange 101. A disk 105 is located adjacent washer 104. A piston ring 107 circular and L-shaped slidingly engages the internal diameter 106 of cover 94. The base of the L abuts disk 105. A second disk 108 abuts one surface of the L. A cap 110 provided with a recess 111 bears against second disk 110. An O ring 112 lies in recess 111 and engages the leg of the L of piston ring 107. A nut 113 engages threads 103 forcing cap 110, second disk 108, piston ring 107, disk 105 and washer 104 together, as a unit, against flange 101. Cover 94 is provided with an indented portion which acts as a bumper for the end 114 of piston 100, to provide an atmospheric chamber 115 between cap 110 and the end of cover 94. A vacuum chamber 95 is formed between disk 105 and housing 90. A spring 116 is interposed between disk 105 and housing 90. Conduit 63 connects atmospheric chamber 115 with port 62 and chamber 53.

Housing 90 is provided with two passageways 117 and 118 leading from vacuum chamber 95 to secondary vacuum chamber 91. A cavity 120 having a conduit 124 leading to vacuum chamber 95 is provided in housing 90. A thread 121 is provided in the outboard end of cavity 120. A check valve 301 is located in cavity 120. It consists of a split ring 122, placed in a recess in housing 90 approximately midway of the depth of cavity 120, retaining a detent consisting of a ball 123 having a spring 123A interposed between split ring 122 and ball 123, whereby, ball 123 is normally held against the intersection of conduit 124 with cavity 120. Split ring 122 is provided with a port 125.

Housing 90 is provided with threads 126. A cap 127 is secured to threads 126 forming hydraulic cylinder 92. A hydraulic piston 130 is provided with a passageway 128. A slot 128A, in piston 130, is provided with packing material 131 and is slidably mounted in hydraulic cylinder 92. Hydraulic piston 130 is secured to piston rod 100 by means of pin 133. A yoke 132 is provided with a flat projection which engages passageway 128. That flat projection is smaller than passageway 128 thereby allowing a conduit to exist for the passage of hydraulic fluid. A spring 132A is interposed between the end of yoke 132 and the base of piston 130. The end of piston rod 100 retains the yoke 132 in slot 128. The yoke 132 is therefore slidably mounted in passageway 128 and is held in one position by means of spring 132A. A cap 134 provided with a port 135 is fixed to hydraulic piston 130 by means of snap retaining ring 129. A detent consisting of a ball 136 and a spring 137 interposed between ball 136 and cap 134 engages passageway 128. Fluid pressure forces ball 136 against the tension of spring 137 away from passageway 128. A pipe thread 140 located in housing 90 is connected to hydraulic cylinder 92 by means of conduit 141. A plug 140A is secured in thread 140. Power unit 12 is manufactured by the Bendix Aviation Corporation, Brake Division, South Bend, Indiana and is a Bendix Hydrovac, Model 500.

A cover 142 provided with a third vacuum chamber 143 and a outlet 144 is secured as by means of screws 446 to housing 90 with a diaphragm 145 inserted between housing 90 and cover 142. A conduit 61 connects outlet 144 with port 60. Diaphragm 145 therefore separates secondary vacuum chamber 91 from third vacuum chamber 143. Diaphragm 145 is provided with a port 146. A cap 147 provided with a projection 148 and a plurality of ports 150 is riveted to diaphragm 145 by means of a plurality of rivets 151 which also secure a cup shaped washer 152 to diaphragm 145. A plug 153 provided with a cavity 154 is secured to housing 90 by means of threads 155. Projection 148 passes through an orifice in plug 153 to project into cavity 154 and engage a piston consisting of a disk 156 and packing material 157. Housing 90 is provided with a cavity 158 which form a continuation of cavity 154. A conduit 160 is blocked by a plug 161 fixed in housing 90 and is provided as a manufacturing expedient in order to produce conduit 162 which connects cavity 158 with hydraulic cylinder 92. A plug 163 is provided in conduit 162 to seal the end of conduit 162. Cover 142 is provided with a hollow projection 165 having oppositely disposed ribs 166 and 167 which form a passageway 168. The hollow 170 in projection 165 forms part of a hollow core 171 in cover 142. An air filter consisting of a disk 172 having a plurality of orifices 172A and a disk 173 having a plurality of orifices 173A with filter material 174 between said disks 172 and 173 is fixed in hollow core 171 by means of split rings 175 and 176. A piston consisting of a shank 177 having oppositely disposed disk ends 180 and 181 is mounted to reciprocate in passageway 168. A spring 182 is interposed between cup shaped washer 152 and the base of rib 166. A spring 183 is interposed between disk 180 and disk 173.

Referring to Figure 1. The vacuum from engine manifold 17 manifests itself through conduit 300 to provide a vacuum in vacuum chamber 95 through check valve 301 by sucking or drawing ball 123 against the tension of spring 123A away from the intersection of conduit 124 with cavity 120. Thus a vacuum is created in vacuum chamber 95.

Referring to Figure 2. At this point in the operation of the motor vehicle, the accelerator pedal 21 is in the full line position, shown in Figure 2. Disk 67 and lever 65 are also in the full line position. Valve flange 73 is positioned in valve seat 56 blocking port 55. Piston 260 of power unit 12 is in the operative position shown in Figure 2 whereby hydraulic piston 130 forces hydraulic fluid out of hydraulic cylinder 92 through connection 302 leading to the brake cylinders on the wheels of the motor vehicle.

Referring to Figure 1, the vacuum in vacuum chamber 95 manifests itself through passageways 117, 118, secondary vacuum chamber 91, ports 150, port 146, third vacuum chamber 143, outlet 144, conduit 61, port 60 and chamber 52 where the vacuum is trapped by flange valve 73 engaging valve seat 56. Atmospheric pressure passes (Figure 2) through air filter 84 into chamber 54, port 57, chamber 53, port 62, conduit 63, and into atmospheric chamber 115 whereby said atmospheric pressure pushes piston 260 against the tension of spring 116 so that piston 260 moves forwardly from the position shown in Figure 1 to the position shown in Figure 2. Hydraulic piston 130 is thereby moved forwardly to force hydraulic fluid out of hydraulic cylinder 92 as previously described.

As the accelerator 21 is depressed to the full line position, refer to Figure 1, flange 26 is pushed forwardly from the right hand dot and dash line position to the full line position. Spring 81 acting against collar 75 and shoulder 74, forces piston 71 rearwardly to unseat valve flange 73 (as shown). Lever 65 is thereby moved to the neutral position shown in full lines in Figure 1 from the dot and dash line position. Continued depression of accelerator 21 from the full line position to the lower dot and dash position causes accelerator rod 25 to move from the neutral position illustrated in full lines to a position where head 380 engages surface 380A to move control sleeve forward whereby the carburetor admits more gasoline to the cylinder to speed up the engine. Simultaneously, atmospheric pressure is shut off from chamber 53 through the seating of packing material 76 engaging valve seat 58. Spring 116 forces piston 260 rearwardly.

The rearward action of piston 260 pulling hydraulic piston 130, releases the hydraulic fluid pressure on the brake cylinders to release the brakes. Further depression of accelerator pedal 21 causes the motor vehicles to travel at any speed in the conventional manner. The brakes are inoperative.

As the foot is released from depressing accelerator pedal 21, flange 26 moves from the left hand dot and dash position as shown in Figure 1 to the full line position. Flange 26 contacts disk 67. As the foot is further released from accelerator pedal 21, flange 26 moves disk 67 toward the right hand dot and dash position. This movement actuates piston 71 to cause piston 260 through hydraulic piston 130 to apply the motor vehicle brakes.

The structure and operation of the present invention with the minimum number of parts has just been described. In the event the engine stalls and also to provide a braking force for a short period of time after the ignition switch is turned off; a reserve vacuum supply is provided in conjunction with an emergency valve 14.

Referring to Figures 2 and 5 wherein is shown an emergency valve 14 consisting of a body 210 formed to provide a central passageway consisting of a chamber 211 and a core 212. Two pairs of oppositely disposed conduits 213, 214, 215, 216 are located in body 210. A cap 220 is provided with a conduit 221. A diaphragm 230 is secured between cap 220 and body 210 providing a chamber 228. A spring 231 is interposed between a washer 307 and cap 220. A piston 232 is provided with two disks 261 and 262 which slidingly engage core 212. Disk 261 blocks conduits 213, 214. Disk 262 blocks conduits 215, 216. One end of piston 232 is secured to diaphragm 230 by means of a pin 305 which pivotally connects the end of piston 232 to the yoke of a rivet 306 which secures washer 307 to diaphragm 230. Two electrical contacts 233 and 234 are secured in body 210 by means of insulated bushings 308 and 309. The end of piston 232 is reduced to provide a surface 315 upon which a disk 310 electrically conductive, may slide. A washer 311 is positioned against the shoulder formed by the reduced portion 315 with the main body of piston 232. A second washer 312 separated from disk 310 by means of an insulated washer 313 is slidably mounted on the reduced portion 315. A spring 316 is interposed between washers 311 and 312.

A vacuum supply tank 16 is provided with a conduit 317 connecting the manifold 17 with vacuum supply tank 16. Conduit 214 connects vacuum supply tank 16 with core 212. Conduit 221 connects chamber 228 with manifold 17. Conduit 300 as previously described in conjunction with the mechanism shown in Figure 1 is made to connect conduits 213 and 215 with check valve 301 instead of connecting check valve 301 with manifold 17. Conduit 216 connects core 212 with manifold 17. Electrical contacts 233 and 234 are not put to use in the arrangement shown in Figure 2. Their purpose will appear in conjunction with the mechanism shown in Figure 3.

When the engine of the motor vehicle is functioning manifold 17 creates a vacuum in vacuum supply tank 16. The supply in vacuum supply tank 16 is approximately six times the volume of vacuum chamber 95 of power unit 12.

When the operative turns the ignition key off after the motor vehicle has been brought to a stop and the operatives foot has been removed from the acellerator pedal 21, the control valve 11 and power unit 12 will have their moving parts in the position shown in Figure 2. The brakes are applied. In this position disk 262 blocks conduits 215, 216. Disk 261 allows the vacuum from vacuum supply tank 16 to pass through conduit 214 into core 212, conduit 213, conduit 300, passed check valve 301 into vacuum chamber 95. The vacuum then causes the functions previously described.

As soon as the engine is stopped back pressure from the manifold 17 will pass through conduit 221 into chamber 228, assisting spring 231 in forcing piston 232 and disks 261 and 262 into the position whereby disk 261 allows the vacuum to pass from conduit 214, core 212 to conduit 213. The vacuum in core 212 and chamber 211 aids spring 231 in flexing diaphragm 230 to move piston 232.

When the engine is running and a vacuum is created in manifold 17, said vacuum will pass through conduit 221 into chamber 228 and thereby such diaphragm 230 against the tension of spring 231, positioning piston 232 and disks 261, 262 so that disk 261 blocks conduits 213, 214 and disk 262 allows the vacuum from manifold 17 to pass through conduit 216, core 212, conduit 215, conduit 300 to vacuum chamber 95.

The mechanism shown in Figure 3 is a further modification of the mechanism shown in Figures 1 and 2. Additional features of safety are provided such as an anti-skid unit 13 used in conjunction with a solenoid 19, a solenoid check valve 15, a check valve 7 and an electrical system under control of the ignition switch.

Referring to Figures 3 and 6 wherein is shown the anti-skid unit 13 consisting of a housing 320 forming a cavity 321, a gear box 322 and provided with a conduit 323. An inertia governor generally indicated at 324 and located in cavity 321 consists of two oppositely disposed arms 325 and 326. Counterweight 327 is pivotally connected to arms 325 and 326 by means of links 328 and 329. Counterweight 330 is pivotally connected to arms 325 and 326 by means of links 331 and 332. A spring 356 is tensioned and connected on opposite ends to counterweights 327 and 330.

A tubular body 333 is divided into two sections 334 and 335 by means of a separator 336 fixed in said body 333. Said body 333 is secured to housing 320. A wire coil 337 is located in section 335. By means of insulated bushings 338 and 339 wire coil 337 provides wire connections 340, 341. A plunger 342 is mounted for reciprocation through electrical induction of coil 337 in separator 336. A spring 343 is interposed between separator 336 and a shoulder on plunger 342. Conduit 323 is shaped to form a chamber 344. Plunger 342 passes through an opening in housing 320 to extend into chamber 344. A piston rod 345 slidably mounted in housing 320 is secured on one end to arm 325. A block 346 is pivotally mounted to the other end of piston rod 345 by means of a pin 347. Block 346 is slidably mounted in chamber 344. A spring 348 is interposed between housing 320 and block 346. The end of plunger 342 engages block 346. Block 346 moves into and out of conduit 323 as will presently appear. Arm 326 is provided with an extension 350 having a thread 351. See Figure 9. Arm 326 is rotatably mounted in a bushing 352 fixed in housing 320. A pinion gear 353 is rotatably mounted on threads 351. Housing 320 is provided with a recess 354 adapted to accommodate a collar 355 fixed to the end of extension 350. A shaft 349 connected to the speedometer cable of the motor vehicle is rotatably mounted in gear box 322. A gear 357 secured to shaft 349 meshes with pinion 353. A plunger 358 fabricated from insulated material is slidably mounted in gear box 322. An electrical grounded spring contact 360 is fixed to gear box 322. Plunger 358 engages contact 360. A cover 361 is secured to gear box 322. A wire contact 362 is secured in cover 361 by means of insulated bushing 363. Spring contact 360 under the influence of plunger 358 engages contact 362.

Referring to Figures 3 and 7 wherein is shown a solenoid check valve generally indicated at 15. It comprises a housing 190 having an axial core 191, provided with a base recess 192 and a valve seat 195. Two conduits 193, 194 are located on opposite sides of housing 190 and connect with axial core 191 on opposite sides of valve seat 195. A separator 196 is fixed in axial core 191. A wire coil 197 is located in axial core 191 on one side of separator 196. A plate 198 fixed to housing 190 is provided with insulated bushings 199 and 200 which accommodate ends 201 and 202 of wire coil 197. A plunger 203 is reciprocatingly mounted in separator 196 and in coil 197. It is provided with a valve head 204 and an extension 205 which slidably engages base recess 196. A spring 206 is interposed between valve head 204 and separator 196. Electrical induction in coil 197 on plunger 203 overcomes the tension of spring 206 causing valve head 204 to engage valve seat 195. A conduit 207 connects conduit 193 with fitting 302. A conduit 208 connects conduit 194 with the hydraulic brake cylinders on the wheels.

Referring to Figures 3 and 8 wherein is shown a check valve 7. Conduit 317 leading from manifold 17 is formed into a cup 365. A conduit 366 connected on one end to vacuum supply tank 16 is formed into a plug 367 having a cavity 368. Plug 367 engages cup 365 in a fluid tight relationship. A detent consisting of a ball 370 and a spring 371 is located in cavity 368 with the ball 370 engaging and disengaging the hollow core of conduit 366.

Referring to Figure 3 and the linkage connecting the accelerator pedal 21 to the carburetor. The carburetor rod 372 leading from the motor vehicle carburetor is threaded on end 373. A connector 374 is provided with male threads 375 on one end and female threads adapted to receive threads 373 on the other end. A lock nut 376 secures carburetor rod 372 with connector 374. A control sleeve 24 is provided axially with a hollow sleeve 377 and female threads adapted to accommodate male threads 375. A lock nut 378 secures male threads 375 in control sleeve 24. A stud 27 provided with threads which engage threads in intermediate link 25 secures flange 26 between stud 27 and link 25. Stud 27 is provided with a head 380 which slidably engages hollow sleeve 377.

Referring to Figure 4 wherein is shown a schematic wiring diagram: A motor vehicle storage battery is generally indicated by reference numeral 5. "G" represents the grounded side of the battery. A conduit 390 leads from the battery to the ignition switch 6. A conduit 391 leads from the ignition switch 6 to conduit 341 of the anti-skid unit 13. Conduit 340 from coil 337 leads to electrical contact 362. Spring contact 360 when closed energized coil 337. Spring contact 360 is grounded at G2. Conduit 391 also connects ignition switch 6 with conduit 234 of emergency valve 14. Conduit 233 connects with conduit 202 of the coil 197 in solenoid check valve 15. Conduit 201 of coil 197 is grounded at G3. When conduits 233 and 234 of emergency valve 14 are connected through disk 310, the circuit leading to the solenoid check valve 15 is closed actuating plunger 204 and thereby maintain the hydraulic brake fluid in the brake cylinders; retaining the brakes operative.

*Operation*

The turning of the ignition switch starting the engine creates a vacuum in engine manifold 17. The operation of vacuum supply tank 16, emergency valve 14, control valve 11 and power unit 12 has been previously described.

The conventional hand or emergency brake will be employed when the motor vehicle is parked with the engine inoperative.

The present accelerator brake control is operative with a clutch type transmission. However, the full advantage of the present invention is lost if an operative must throw out the clutch to shift to cause movement of the motor vehicle. An automatic type transmission is preferably used in conjunction with the present invention.

Referring to Figures 3 and 4, the turning of the ignition switch 6 closes the electrical circuit. Electrical current from the battery 5 will travel through conduit 391 to coil 337 and contact 234. Coil 337 will become energized when contact 360 engages contact 362 as will presently appear. Contacts 233 and 234 when engaged by disk 310 will energize coil 197 as will presently appear.

The emergency brake is released and the operative's foot engages and depresses accelerator pedal 21 causing intermediate link 25 to move flange 26 from the right hand dot and dash position to the full line position as shown in Figure 3. The movement of lever 65 releases the hydraulic brakes through control valve 11 and power unit 12 as previously described. Simultaneously head 380 sliding in chamber 377 of control sleeve 24 will move through a "neutral" zone. That is a zone or area where depressing the accelerator pedal 21 produces an ineffectural travel before engaging the connector 374 to actuate the carburetor rod 372 to feed more gasoline to the cylinders to speed up the engine. This area of travel is a time interval to allow the brakes of the motor vehicle to be released.

An observation is made that this time interval of extremely short duration replaces the time interval formerly required by the operative to shift a foot from the accelerator pedal 21 to the brake pedal. One of the outstanding accomplishments of the present invention is to reduce the time lag between removing an operative's foot from the accelerator to applying the brake.

This neutral zone also allows the operative to permit the engine to cruise without applying the brake because head 380 in chamber 377 must return to the "brake" zone before flange 26 engages disk 67 to actuate lever 65 and piston 71 to set in motion the mechanism to apply the vehicle's brakes.

Referring to Figure 3. The motor car is now travelling at a desired speed in the conventional manner. The brakes are inoperative. If the motor vehicle is to be stopped in the normal manner, the foot is gradually lifted from accelerator pedal 21 setting in motion the mechanism of control valve 11, power unit 12, emergency valve 14 and vacuum supply tank 16 as previously described.

If the operative's foot is jerked free of accelerator pedal 21, as with a sudden jolt, then the mechanism of the anti-skid device 13 is set in motion to prevent the wheels of the motor vehicle from locking under the sudden impact of the hydraulic fluid. The sudden withdrawal of the foot from accelerator pedal 21 causes piston 71 to open chamber 53 to atmospheric pressure as previously described. Atmospheric pressure travels through conduit 63 to atmospheric chamber 115. A vacuum having been created in vacuum chamber 95. The sudden denial of gasoline to the engine causes the engine to slow down rapidly causing the motor vehicle to slow up or check itself. Speedometer cable 349 is attached on one end to the drive shaft of the motor vehicle. Therefore the rotation of the speedometer cable 349 drops rapidly causing gear 357 to suddenly slow its rotation. Governor 324 having the rotation or inertia of the original speed and the governor 324 inherently trying to maintain that speed, rotates extension 350 at that speed. Gear 357 engaging pinion 353 attempts to hold back the rotation of pinion 353. Pinion 353 is forced to yield because the pinion drives the governor and the governor is rotating at a greater speed. Pinion 353 walks on threads 351 toward insulated rod 358 forcing rod 358 against contact 360 and thereby closes the gap between contacts 360 and 362 closing the electric circuit from battery 5 whereby coil 337 is energized actuating piston 342 by drawing it into coil 337, and away from plug 346. Governor 324 begins to slow up. Springs 356 and 348 force the links 327 and 330 toward each other thereby forcing plug 346 out of the position whereby it blocks conduit 323. This action allows atmospheric pressure from conduit 63 to pass through conduit 323 to chamber 143. Disk 181 is away from cup shaped washer 152. Atmospheric pressure therefore enters vacuum chamber 95 from chamber 143 to release piston 260 to the influence of spring 116 by providing atmospheric pressure on both sides of piston 260. Thereby releasing the brakes through the movement of hydraulic piston 130 in hydraulic cylinder 92. This action takes place instantaneously. As the governor 324 slows down, pinion 353 through the slower rotation of gear 357, rotates at a slower rate of speed than extension 350. Pinion 353 rotates on threads 351 to reposition itself away from insulated rod 358 to normal position. The contacts 360 and 362 separate to break the electrical circuit. Coil 337 is deenergized freeing piston 342 to the action of spring 343 whereby piston 342 engages head 346 in position to block conduit 323. Thereby shutting off atmospheric pressure to vacuum chamber 95 and permitting vacuum to again enter vacuum chamber 95 so that piston 260 can again be actuated to apply the brakes.

Assuming the motor vehicle is traveling at a normal speed in a normal way on a level grade or down hill. Suddenly the engine stops due to engine failure. Check valve 7 instantly traps the vacuum in vacuum supply tank 16 because the vacuum in the engine manifold 17 is lost. Atmospheric pressure replaces the vacuum in manifold 17. Atmospheric pressure from manifold 17 passes through conduit 221 to chamber 228 allowing spring 231 to actuate diaphragm 230 to force disk 310 to close the circuit between contacts 233, 234 to energize coil 197, thereby drawing piston 203 into coil 197. Valve plug 204 engages valve seat 195 to block communication between conduits 207, 208. Disk 262 moves into position between ports 215, 216. Disk 261 moves out of blocking position in front of ports 213, 214 to permit free communication from vacuum supply tank 16 through conduit 214 to core 212, port 213, conduit 300 to vacuum chamber 95. Thereby maintaining the vacuum in vacuum chamber 95.

The operative's foot will be raised or removed from accelerator pedal 21 to apply the brake. The brakes will be applied as previously described.

Hydraulic piston 130 moves forwardly in hydraulic cylinder 92 forcing hydraulic fluid through conduit 207, into chamber 191 and thereby lifting valve plug 204 away from valve seat 195 against the pull of coil 197 to allow hydraulic fluid to enter conduit 208 leading to the brake cylinders. The moment the pressure is released in hydraulic cylinder 92 coil 197 pulls valve plug 204 into engagement with valve seat 195. Thereby trapping the fluid in the brake cylinders. Reactivation of the engine will create a vacuum in manifold 17 and through conduit 221 a vacuum will be created in chamber 228. Diaphragm 230 is sucked rearwardly against the tension of spring 231 thereby pulling disk 310 away from contacts 233 and 234 interrupting the circuit to coil 197. Spring 206 raises valve plug 204 away from valve seat 195 permitting the pressure of hydraulic fluid to be released from the brake cylinders.

It is contemplated that the present invention will replace the conventional foot brake pedal on a motor car. However, provision is made to allow the present invention to be used with a convention footbrake pedal. Flange 26 is removed to render inoperative control valve 11 with the various parts as shown in Figure 1 wherein spring 81 maintains flange valve 73 unseated from valve seat 56 and washer 76 seated against valve seat 58. When the foot brake pedal is applied hydraulic fluid in the conduit leading from the foot brake pedal to the threads 140 in housing 90 will pass into conduit 141 and into chamber 92 from where it will pass into conduit 162 and cavity 158. The fluid in cavity 158 will actuate disk 156 thereby forcing projection 148 and diaphragm 145 into position to engage disk 181 (see Figure 2) whereby piston 177 moves disk 180 away from rib 167 against the tension of spring 183 to allow atmospheric pressure to pass through port 171, cavity 170, chamber 143, outlet 144, conduit 61, port 60, chamber 52, port 55, chamber 53, conduit 63 into atmospheric chamber 115 where piston 260 applies the braking force as previously described. Cap shaped washer 152 engages disk 181 so that port 146 is rendered ineffectual.

It will be noted that disk 180 is held against rib 167 by spring 183 preventing atmospheric pressure from passing into passageway 168 from hollow core 171 when the accelerator 18 is used without a brake pedal and in place of the brake pedal.

Spring 81 holds collar 75 and washer 76 against valve seat 58 preventing atmospheric pressure from passing from port 83 to chamber 53 when the conventional brake pedal is used with the present mechanism. The accelerator 18 performing its normal function.

Figure 10:
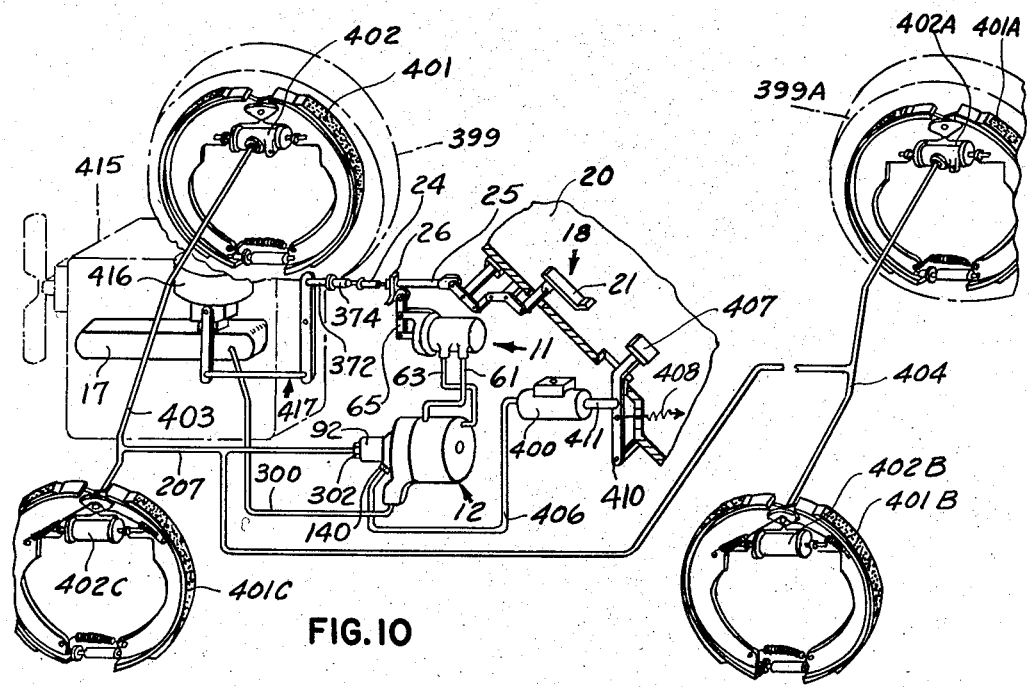
Figure 10 is a schematic perspective view of a motor vehicle showing the braking system connected with the new and improved accelerator brake control.

Referring to Figure 10 wherein is shown a schematic perspective view of a motor vehicle, by way of example but not of limitation, a hydraulic automobile brake system having a master hydraulic cylinder 400, brake members 401, 401A, 401B, 401C, expandable against brake bands (not shown) on wheels indicated by dot and dash lines 399, 399A etc., by any conventional means, such as hydraulic cylinders 402, 402A, 402B, 402C.

Fluid conduit 403 connects hydraulic cylinders 402, 402C. Fluid conduit 404 connects hydraulic cylinders 402A, 402B. A common fluid conduit 207 connects fitting 302 with fluid conduits 403 and 404. A fluid conduit 406 connects pipe thread 140 in power unit 12 with master cylinder 400.

A conventional brake pedal 407 is connected to the conventional master hydraulic cylinder 400 of the usual type, so that depression of the brake pedal (to the left, as illustrated in Figure 10) against the tension of a customary frame-anchored coil spring 408 as about a pivot 410, a plunger 411 pivotally secured to the pedal lever applies pressure to the brake fluid within the master cylinder and through fluid conduit 406 to conduit 141 as previously described, it being understood that use of the conventional brake pedal 407 necessitates the removal of flange 26 to render inoperative brake control through accelerator pedal 21. Conversely, brake pedal 407, master hydraulic cylinder 400 are contemplated to be eliminated by the present invention with the substitution of plug 140A for conduit 406.

A conventional internal combustion engine for the motor vehicles is indicated at 415 and is provided with a conventional carburetor indicated at 416 and a manifold 17. A linkage generally indicated at 417 connects carburetor rod 372 to carburetor 416.

Figure 11:
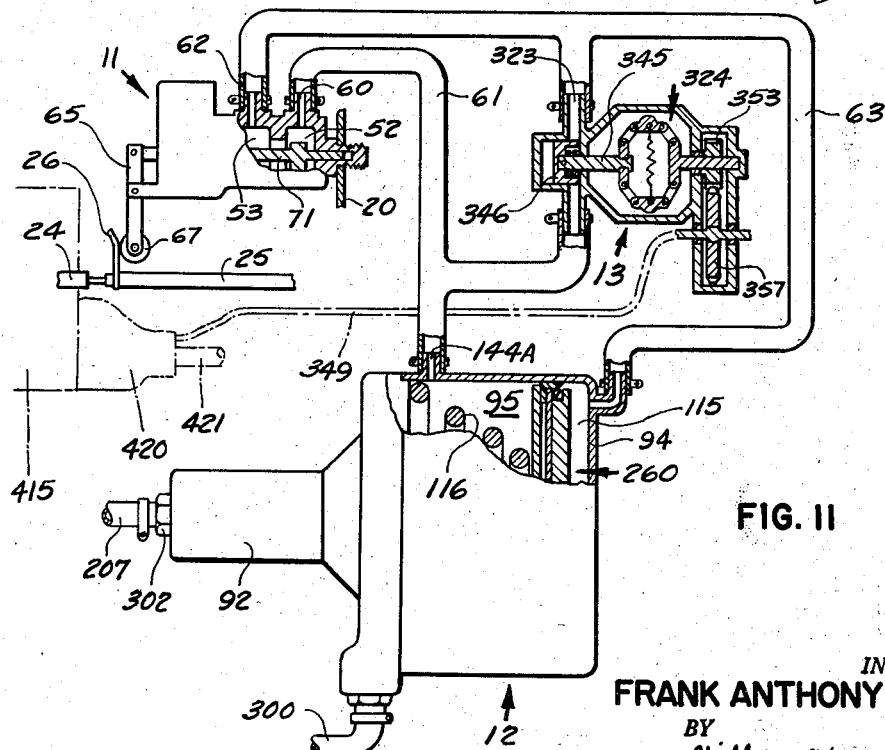
Figure 11 is a side elevational view, with sections broken away for clarity, showing a modified form of anti-skid device and a modified form of power unit.

Referring to Figure 11 wherein is shown a modified form of anti-skid device 13 and a modified form of powder unit 12 with the speedometer cable 349 connection; the conventional combustion engine indicated at 415 is provided with a conventional torque converter or fluid drive transmission indicated at 420 having the conventional drive shaft indicated at 421 and a conventional speedometer cable 349 connected to drive shaft 421.

The power unit 12 illustrated in Figure 11 provides for conduit 61 connecting chamber 52 through outlet 144A directly to vacuum chamber 95 instead of connecting chamber 52 with outlet 144, third vacuum chamber 143, secondary vacuum chamber 91 and vacuum chamber 95. Third vacuum chamber 143 and secondary vacuum chamber 91 along with the mechanism located in these chambers may be eliminated if it is contemplated to not provide for use of conventional brake pedal 407.

Inertia governor 324 in the form shown in Figure 11 differs from Figures 3 and 6 in that the electrical unit is dispensed with in this modification.

Having illustrated and described preferred embodiments of the present invention, by way of example, but realizing that structural changes could be made and other examples given without departing from either the spirit or scope of this invention.

What I claim is:

1. An accelerator brake control consisting of an engine manifold provided with a vacuum, a control valve and a power unit comprising a housing having a chamber, a spring loaded piston separating said chamber into a vacuum side and an atmospheric pressure side, said control valve selectively permitting passage of atmospheric air into the pressure side of said chamber and selectively permitting a vacuum condition to be present in said atmospheric pressure side, a conduit provided between said engine manifold and said vacuum side whereby in one selected position of said control valve a vacuum is present in said vacuum side and in said atmospheric pressure side to condition said piston to the influence of said spring and in another selected position of said control valve a vacuum is present in said vacuum side and atmospheric pressure is present in said atmospheric pressure side whereby said piston is moved in said chamber against the force of said spring a second valve is provided, an inertia governor is operatively connected to said second valve for actuating said second valve to admit atmospheric air to the vacuum side of said chamber when said inertia governor is in operative position and said control valve has selectively permitted a vacuum condition to be present in said vacuum side of said chamber.

2. An accelerator brake control for a motor vehicle having a plurality of wheels and consisting of an engine manifold provided with a vacuum, an accelerator, a control valve and a power unit comprising a housing having a chamber, a spring loaded piston separating said chamber into a vacuum side and an atmospheric pressure side, said control valve selectively permitting passage of atmospheric air into said atmospheric pressure side of said chamber and selectively permitting a vacuum condition to be present in said atmospheric pressure side of said chamber, linkage means operated by the accelerator for selectively actuating said control valve, a conduit between said engine manifold and said vacuum side whereby in one selected position of said accelerator a vacuum is present in said vacuum side and through said control valve on said atmospheric pressure side to condition said piston to the influence of said spring and in another selected position of said accelerator a vacuum is present in said vacuum side and through said control valve atmospheric pressure is present in said atmospheric pressure side whereby said piston is moved in said chamber against the force of said spring, a second valve is provided, an inertia governor is provided controlling said second valve, a second means operatively connected to said inertia governor is provided for actuating said second valve to admit atmospheric air to the vacuum side of said chamber, a vacuum supply tank, a check valve and an emergency valve are positioned in said conduit between said engine manifold and said vacuum side whereby said engine manifold in one condition creates a vacuum in said vacuum supply tank by passing through said check valve, while at the same time said engine manifold maintains said emergency valve in position to block escape of said vacuum from said vacuum supply tank and said engine manifold in another condition when atmospheric air is present in said engine manifold permits said emergency valve to move to a second position whereby said emergency valve blocks out the influence of said engine manifold on said vacuum side through said conduit and unblocks the escape of vacuum from said vacuum supply tank to said vacuum side to substitute the vacuum from said vacuum supply tank for the vacuum from said engine manifold, said check valve blocking the influence of atmospheric air in said engine manifold upon said vacuum supply tank.

3. A mechanism as defined in claim 2 being further characterized in that a first hydraulic cylinder is provided, a second piston slidably mounted in said hydraulic cylinder is provided and connected to said first mentioned piston, a hydraulic cylinder provided on each of said plurality of wheels, a conduit connecting each of said hydraulic cylinders on said plurality of wheels with said first hydraulic cylinder, the movement of said first mentioned piston moving said second piston to actuate said hydraulic cylinders on each of said plurality of wheels.

4. An accelerator brake control consisting of an engine manifold having a vacuum, an accelerator, a control valve and a power unit comprising a housing having a chamber, a vacuum operated first piston slidably mounted in said chamber and dividing said chamber into a vacuum chamber and an atmospheric chamber, a first conduit connecting said vacuum in said engine manifold with said vacuum chamber, a hydraulic cylinder formed in said housing, a piston rod forming part of said first piston, a hydraulic piston slidably mounted in said hydraulic cylinder connected to said piston rod, a spring in said vacuum chamber urging said first piston in a direction to reduce the area of the atmospheric chamber, a control valve provided with a first chamber, a second chamber and a third chamber, a port on one side of said first chamber exposed to the atmosphere, a second port between said first chamber and said second chamber, a third port between said second chamber and said third chamber, a third piston operably connected to said accelerator and reciprocally mounted in said control valve and provided with a first valve seat engageable and disengageable with said third port, a second seat on said third piston engageable with said second port when said first valve seat is disengaged from said third port and disengageable from said second port when said first valve seat engages said third port, a second conduit uniting said second chamber with said atmospheric chamber and a third conduit uniting said third chamber with said vacuum chamber.

5. An accelerator brake control consisting of a manifold producing a vacuum, an accelerator, a control valve and a power unit comprising a housing having a chamber, a vacuum operated first piston having a piston rod, slidably mounted in said chamber and dividing said chamber into a vacuum chamber and an atmospheric chamber, a first conduit connecting said manifold with said vacuum chamber, a bumper in said housing engageable with said first piston to provide a minimum area for said atmospheric chamber, a hydraulic cylinder having an outlet formed in said housing, a hydraulic piston slidably mounted in said hydraulic cylinder connected to said piston rod, a spring located in said vacuum chamber acting on said first piston, a control valve provided with a first chamber, a second chamber and a third chamber, a first port on one side of said first chamber leading to the atmosphere, a second port between said first chamber and said second chamber, a third port between said second chamber and said third chamber, a third piston operably connected to said accelerator and reciprocally mounted in said control valve and provided with a first valve seat engageable and disengageable with said third port, a second valve seat on said third piston engageable and disengageable with said second port, a second conduit uniting said second chamber with said atmospheric chamber and a third conduit uniting said third chamber with said vacuum chamber, said accelerator in one position actuating said third piston to engage said first valve seat with said third port and to disengage said second valve seat from said second port to allow atmospheric pressure entering said first port and first chamber to pass through said second port, second chamber, second conduit and enter said atmospheric chamber to actuate said first piston against the resistance of said first spring whereby said hydraulic piston slidably moves in said hydraulic cylinder, vacuum from said manifold passing through said first conduit to said vacuum chamber and through said third conduit to said third chamber, said accelerator in a second position actuating said third piston to disengage said first valve seat from said third port and to engage said second valve seat with said second port to allow vacuum passing from said manifold through said first conduit, vacuum chamber, third conduit, third chamber, third port, second chamber, second conduit to said atmospheric chamber where a vacuum is created to allow said first spring to position said first piston against said bumper and hold said hydraulic piston in a preselected position in said hydraulic cylinder.

6. An accelerator brake control consisting of an engine manifold having a vacuum, an accelerator, a control valve, a vacuum supply tank, an emergency valve and a power unit comprising a housing having a chamber, a vacuum operated first piston slidably mounted in said chamber and dividing said chamber into a vacuum chamber and an atmospheric chamber, a hydraulic cylinder formed in said housing, a piston rod forming part of said first piston, a hydraulic piston slidably mounted in said hydraulic cylinder connected to said piston rod, a spring in said vacuum chamber acting on said first piston, a control valve provided with a first chamber, a second chamber and a third chamber, a port on one side of said first chamber leading to the atmosphere, a second port between said first chamber and said second chamber, a third port between said second chamber and said third chamber, a third piston operably connected to said accelerator and reciprocally mounted in said control valve and provided with a first valve seat engageable and disengageable with said third port, a second seat on said third piston engageable and disengageable with said second port, a second conduit uniting said second chamber with said atmospheric chamber, a third conduit uniting said third chamber with said vacuum chamber, said emergency valve comprising a body having a passageway consisting of a fifth chamber and a core, a cap having a fourth conduit, a diaphragm, said cap securing said diaphragm to said body at said fifth chamber to provide a sixth chamber, a spring positioned between said cap and said diaphragm, a fourth piston having a first disk and a second disk slidably mounted in said core and fixed on one end to said diaphragm, a fifth conduit and an oppositely disposed sixth conduit located in said body, a seventh conduit and an oppositely disposed eighth conduit located in said body, said sixth and eigth conduit interconnecting to provide a first conduit connecting said core with said vacuum chamber, said fourth conduit connecting said sixth chamber with said engine manifold, said fifth conduit connecting said core with said engine manifold, a ninth conduit connecting said engine manifold with said vacuum supply tank, said seventh conduit connecting said core with said vacuum supply tank, said seventh conduit connecting said core with said vacuum supply tank, said first disk engaging and disengaging said fifth and sixth conduits, said second disk engaging said seventh and eighth conduits when said first disk disengages said fifth and sixth conduit and said second disk disengaging said seventh and eighth conduits when said first disk disengages said fifth and sixth conduits.

7. An accelerator brake control consisting of an engine manifold provided with a vacuum, an accelerator, a control valve, a vacuum supply tank, an emergency valve and a power unit, linkage means operated by the accelerator for selectively actuating said control valve, said power unit comprising a housing having a chamber, a spring loaded piston separating said chamber into a vacuum side and an atmospheric pressure side, said control valve under control of said accelerator selectively permitting passage of atmospheric air into the pressure side of said chamber and selectively permitting a vacuum condition to be present in said atmospheric pressure side, a connection between said engine manifold and said vacuum supply tank creating a vacuum in said vacuum supply tank, said emergency valve having a diaphragm operated piston, a second connection between said engine manifold and one side of said diaphragm, a third connection between said engine manifold and the other side of said diaphragm, a fourth connection between said vacuum supply tank and the last mentioned side of said diaphragm, a fifth connection between said last mentioned side of said diaphragm and said vacuum side, in one selected position of said accelerator a vacuum from said engine manifold is present in said vacuum side and through said control valve vacuum from said vacuum side is present in said atmospheric pressure side to condition said piston to the influence of said spring, in another selected position of said accelerator a vacuum from said engine manifold is present in said vacuum side and through said control valve atmospheric air is present in said atmospheric pressure side whereby said piston is moved in said chamber against the force of the spring, the vacuum in said engine manifold acting on said diaphragm to permit the vacuum from the engine manifold to pass through said emergency valve to said vacuum side, the loss of vacuum in said engine manifold actuating said diaphragm operated piston to permit the vacuum from said vacuum supply tank to pass through said emergency valve to said vacuum side, said diaphragm actuated piston blocking the connection between said engine manifold and vacuum side when the vacuum in said engine manifold is lost.

8. An accelerator brake control consisting of an engine manifold provided with a vacuum, an accelerator, a control valve, an anti-skid unit provided with a first solenoid, a vacuum supply tank, a first check valve, an emergency valve, a solenoid check valve and a power unit, linkage means operated by the accelerator for selectively actuating said control valve, said power unit comprising a housing having a first chamber, a hydraulic cylinder, a secondary vacuum chamber, a third vacuum chamber, a spring loaded first piston separating said first chamber into a vacuum side and an atmospheric pressure side, a hydraulic piston slidably mounted in said hydraulic cylinder and operatively connected to said first piston, a first diaphragm having a first port interposed between said secondary vacuum chamber and said third vacuum chamber, a second port between said vacuum side and said secondary vacuum chamber, means operatively connected to said hydraulic cylinder to block said first port in said first diaphragm, said control valve under control of said accelerator selectively permitting passage through a first conduit of atmospheric air into said atmospheric pressure side of said chamber and selectively through said first conduit permitting a vacuum condition to be present in said atmospheric pressure side, a second conduit housing said first check valve between said engine manifold and said vacuum supply tank allowing a vacuum to pass from said manifold to said vacuum supply tank, said emergency valve having a diaphragm operated spring loaded second piston, a third conduit between said engine manifold and the spring loaded side of said diaphragm, a fourth conduit between said engine manifold and the side opposite said spring loaded side of said diaphragm, a fifth conduit between said vacuum supply tank and the side opposite said spring loaded side of said diaphragm, a second check valve, a sixth conduit housing said check valve connecting said side opposite said spring loaded side of said diaphragm and said vacuum side of said first piston, a speedometer cable, said anti-skid device consists of a housing forming a cavity, a gear box and a seventh conduit, a governor provided with two oppositely disposed arms is rotatively mounted in said cavity, a pinion mounted for transverse movement is rotatively mounted on one of said arms, a first switch is secured on said gear box and is operatively actuated by the transverse movement of said pinion, a gear operatively connected to said pinion is operatively connected to said speedometer cable to be rotated thereby, a block secured to the second of said oppositely disposed arms is slidably mounted to open and close said seventh conduit, a first solenoid secured to said housing is operatively connected to said block, said seventh conduit connecting said first conduit with said sixth conduit, an eighth conduit connecting said hydraulic cylinder with said solenoid check valve, and electrical circuit having a source of electric power and a second switch, operatively connects said first solenoid, said first switch and said solenoid check valve with said source of electric power and a ninth conduit connecting said control valve with said seventh conduit.

9. An accelerator brake control consisting of an engine manifold having a vacuum, an accelerator, a control valve and a power unit comprising a housing having a first chamber, a hydraulic cylinder, a secondary vacuum chamber, a third vacuum chamber, a vacuum operated spring loaded first piston slidably mounted in said first chamber and dividing said first chamber into a first vacuum chamber and an atmospheric chamber, a first conduit connecting said first vacuum chamber with said engine manifold, a hydraulic second piston slidably mounted in said hydraulic cylinder operatively connected to said first piston, linkage means operated by said accelerator for selectively actuating said control valve, a second conduit uniting said control valve with said atmospheric pressure chamber, a third conduit uniting said control valve with said third vacuum chamber, means between said third vacuum chamber and said secondary vacuum chamber under control of the fluid in said hydraulic cylinder opening and closing communication between said secondary vacuum chamber and said third vacuum chamber, a port between said secondary vacuum chamber and said first vacuum chamber, said control valve under control of said accelerator selectively permitting passage of atmospheric air into said atmospheric chamber whereby said spring loaded first piston is actuated against the tension of said spring to move said hydraulic piston in said hydraulic cylinder in one direction and said control valve under control of said accelerator selectively permitting a vacuum condition to be present in said atmospheric side to condition said spring loaded first piston to the influence of the force of said spring to actuate said spring loaded first piston to move said hydraulic piston in an opposite direction.

10. A control valve having a housing provided with a first chamber, a second chamber, a third chamber, a first port in said housing between said first chamber and the atmosphere, a second port in said housing between said first chamber and said second chamber, a first valve seat in the edge of said port facing said first chamber, a third port in said housing between said second port and said third port, a second valve seat in said port facing said third chamber, a fourth port in said housing exiting said second chamber, a fifth port in said housing exiting said third chamber, a piston mounted for reciprocating movement in said housing and provided with two valves adapted to alternately engage said first valve seat and said second valve seat, a lever pivotally mounted in said housing and pivotally connected to said piston, an accelerator pedal, linkage connecting said accelerator pedal and said lever consisting of an intermediate link, a flange, a stud provided with a head securing said flange to said intermediate link, a control sleeve provided with a hollow area, said head slidingly mounted in said hollow so as to push said control sleeve in one direction when in one end position of said hollow and to pull said control sleeve in an opposite direction when in the opposite end position of said hollow and a neutral or ineffectual operating position in said hollow when said head is intermediate the opposite ends of said hollow, linkage means connecting said accelerator pedal to said intermediate link and adjustable rod means fixed in said control sleeve, said flange engaging and disengaging said lever to actuate said piston to cause alternately one or the other of said two valves on said piston to engage and disengage the respective valve seats.

11. A governor controlled solenoid valve comprising a housing forming a cavity, a gear box, a conduit formed in said housing, a governor rotatively mounted in said cavity, consisting of two oppositely disposed arms, two oppositely disposed counterweights pivotally connected to opposite ends of said arms by means of links, resilient means suspended between and connected to said counterweights, a block slidably mounted and normally positioned in said conduit, operatively connected to one of said arms by means of a piston rod slidably mounted in said housing, a tubular body fixed to said housing, a separator fixed in said tubular body and dividing said body into two cavities, a wire coil located in one of said cavities, a plunger reciprocatingly mounted in said separator and said coil and abutting said block, a shoulder on said plunger, resilient means interposed between said separator and said shoulder, a pinion located in said gear box and mounted on the other of said oppositely disposed arms to rotate said arm and to have limited lateral movement on said arm, a gear rotatively mounted in said gear box, means to drive said gear, an electrical switch secured to said gear box, means actuated by said lateral movement of said pinion to open and close said electrical switch, an electrical circuit connecting said switch with said wire coil, a sudden change in the speed of rotation of said gear effecting lateral movement of said pinion to close said electrical switch to energize said wire coil to withdraw said plunger from abutting position against said block to permit said resilient means to draw said counterweights toward each other to actuate said piston rod to move said block out of blocking position in said conduit.

12. An accelerator brake control consisting of an engine manifold normally under vacuum, a power unit, an accelerator, a first means for normally maintaining said power unit ineffective, a second means connecting said manifold with said power unit for opposing said first means for maintaining said power unit ineffective, a control valve movable to two positions, in one of which it seals said power unit against atmospheric pressure and in another position of which it admits said atmospheric pressure to overcome said first means for maintaining said power unit ineffective in conjunction with the vacuum from said engine manifold, a third means connecting said accelerator to said control valve to admit atmospheric pressure during one range of the travel of said accelerator and to close said control valve to atmospheric pressure during another range of travel of said accelerator, a second valve, an inertia governor, means to activate said inertia governor, said inertia governor operatively connected to said second valve whereby when said inertia governor is activated atmospheric pressure is admitted to overcome said second means to allow said first means to maintain said power unit ineffective so long as said inertia governor is activated and to allow said second means to oppose said first means when said inertia governor is de-activated.

13. An accelerator brake control consisting of an engine manifold normally under vacuum, a power unit, an accelerator, an inertia governor unit, a first means for normally maintaining said power unit ineffective, a second means connecting said engine manifold with said power unit, a control valve movable to an open position and a closed position, in closed position said control valve seals said power unit against atmospheric pressure, in open position it admits atmospheric pressure to overcome said first means for maintaining said power unit ineffective, in conjunction with the vacuum from said engine manifold, a third means connecting said accelerator to said control valve to move said control valve to open and closed positions, a conduit between said control valve and said power unit, a valve in said conduit under control of said inertia governor unit normally closed, a fourth means operable upon said inertia governor to actuate said valve to open position in said conduit to admit atmospheric pressure in opposition to the vacuum from said engine manifold which aids said atmospheric pressure in overcoming said first means which renders said power unit ineffective.

14. In an accelerator brake control for a motor vehicle the combination of having an engine manifold normally under vacuum, a power unit for applying brakes, an accelerator pedal, a first means for normally maintaining said power unit ineffective for applying the brakes, a second means connecting said manifold to said power unit for opposing said first means for maintaining the power unit ineffective, a control valve movable to two positions, in one of which it seals said power unit against atmospheric pressure, and in the other of which it admits atmospheric pressure to overcome the said first means for maintaining the power unit ineffective in conjunction with the vacuum from said manifold, and a third means connecting said accelerator pedal to said control valve to admit atmospheric pressure during one range of its travel and to close said control valve during its movement through the driving range of said accelerator pedal.

15. An accelerator brake control consisting of an engine manifold provided with a vacuum, a control valve and a power unit comprising a housing having a chamber, a spring loaded piston separating said chamber into a vacuum side and an atmospheric pressure side, said control valve selectively permitting passage of atmospheric air into the pressure side of said chamber and selectively permitting a vacuum condition to be present in said atmospheric pressure side, a conduit is provided between said engine manifold and said vacuum side whereby in one selected position of said control valve a vacuum is present in said vacuum side and in said atmospheric pressure side to condition said piston to the influence of said spring and in another selected position of said control valve a vacuum is present in said vacuum side and atmospheric pressure is present in said atmospheric pressure side whereby said piston is moved in said chamber against the force of said spring, a vacuum supply tank and an emergency valve, positioned in said conduit between said engine manifold and said vacuum side whereby said engine manifold in one condition creates a vacuum in said vacuum supply tank while at the same time said engine manifold maintains said emergency valve in position to block escape of said vacuum from said vacuum supply tank and said engine manifold in another condition when atmospheric air is present in said engine manifold permits said emergency valve to move to a second position whereby said emergency valve blocks out the influence of said engine manifold on said vacuum side through said conduit and unblocks the escape of vacuum from said vacuum supply tank to said vacuum side to substitute the vacuum from said vacuum supply tank for the vacuum from said engine manifold.

16. An accelerator brake control consisting of an engine manifold provided with a vacuum, an accelerator, a control valve and a power unit comprising a housing having a chamber, a spring loaded piston separating said chamber into a vacuum side and an atmospheric pressure side, said control valve selectively permitting passage of atmospheric air into the pressure side of said chamber and selectively permitting a vacuum condition to be present in said atmospheric pressure side, linkage means operated by the accelerator for selectively actuating said control valve, a first means between said engine manifold and said vacuum side whereby in one selected position of said accelerator a vacuum is present in said vacuum side and through said control valve on said atmospheric pressure side to condition said piston to the influence of said spring and in another selected position of said accelerator a vacuum is present in said vacuum side and through said control valve atmospheric pressure is present in said atmospheric pressure side whereby said piston is moved in said chamber against the force of said spring, a second valve is provided, an inertia governor controlling said second valve, a second means operatively connected to said inertia governor for actuating said second valve to admit atmospheric pressure to the vacuum side of said chamber.

17. In an accelerator brake control for a motor vehicle the combination of having an engine manifold normally under vacuum, a power unit for applying brakes, and accelerator pedal, a first means for normally maintaining said power unit ineffective for applying the brakes, a second means connecting said manifold to said power unit for opposing said first means for maintaining the power unit ineffective, a control valve movable to two positions, in one of which it seals said power unit against atmospheric pressure, and in the other of which it admits atmospheric pressure, to overcome the said first means for maintaining the power unit ineffective in conjunction with the vacuum from said manifold, and a third means connecting said accelerator pedal to said control valve to admit atmospheric pressure during one range of its travel and to close said control valve during its movement through the driving range of said accelerator pedal, an anti-skid means for the motor vehicle is provided, comprising a fourth means for limitedly opposing the effect of said power unit on the vehicle brakes including a conduit for admitting atmospheric pressure to the vacuum side of said power unit, a valve in said conduit, inertia governor means driven by a part of said motor vehicle which rotates with the drive wheel thereof and a fifth means cooperating therewith to maintain said valve closed when the motor vehicle wheels are in rotation, but which causes said inertia governor means to open said valve when said wheels are locked.

18. In a motor vehicle accelerator brake apparatus for hydraulic brake systems; housing means defining a pressure chamber and a vacuum chamber, atmospheric valve means selectively permitting passage of atmospheric air into the pressure chamber, equalizing valve means selectively permitting passage of atmospheric air from the pressure chamber to the vacuum chamber, linkage means operated by the accelerator for selectively actuating said valve means, whereby in one pre-determined actuation of the accelerator said atmospheric valve means is opened and said equalizing valve means is closed and whereby in a second pre-determined actuation of the accelerator said equalizing valve means is opened and said atmospheric valve means is closed and an inertia governor means in predetermined position permitting atmospheric air to enter said vacuum chamber when said equalizing valve means is closed.

19. In a motor vehicle accelerator brake apparatus for hydraulic brake systems; housing means defining a pressure chamber and a vacuum chamber, atmospheric valve means selectively permitting passage of atmospheric air into the pressure chamber, equalizing valve means selectively permitting passage of atmospheric air from the pressure chamber to the vacuum chamber, linkage means operated by the accelerator for selectively actuating said valve means, whereby in one pre-determined actuation of the accelerator said atmospheric valve means is opened and said equalizing valve means is closed and whereby in a second pre-determined actuation of the accelerator said equalizing valve means is opened and said atmospheric valve means is closed, an engine manifold, a vacuum supply tank, an emergency valve, said engine manifold supplying vacuum to said vacuum chamber, said emergency valve actuating, upon failure of said engine manifold to supply vacuum to said vacuum chamber, to supply vacuum from said vacuum supply tank to said vacuum chamber.

20. An accelerator brake control consisting of an engine manifold normally under vacuum, a power unit, an accelerator, a first means for normally maintaining said power unit ineffective, a second means connecting said manifold with said power unit for opposing said first means for maintaining said power unit ineffective, a control valve movable to two positions, in one of which it seals said power unit against atmospheric pressure and in another position of which it admits said atmospheric pressure to overcome said first means for maintaining said power unit ineffective in conjunction with the vacuum from said engine manifold, a third means connecting said accelerator to said control valve to admit atmospheric pressure during one range of the travel of said accelerator and to close said control valve to atmospheric pressure during another range of travel of said accelerator, a vacuum supply tank, an emergency valve, said vacuum supply tank replacing said vacuum normally supplied by said engine manifold upon failure of said engine manifold to supply a vacuum, said failure actuating said emergency valve to unite said second means with said vacuum supply tank and to disconnect said second means with said engine manifold.

21. In a power brake system, a power unit, a set of brakes, a closed circuit fluid supply between said power unit and set of brakes, an emergency valve, a solenoid check valve, an electrical circuit comprising a source of electrical energy, a first switch, said solenoid in the solenoid check valve and a second switch actuated by said emergency valve, a source of fluid power to activate and deactivate said power unit to actuate and de-activate said set of brakes through said closed circuit fluid supply, said electrical circuit normally energized, failure of said source of power actuating said emergency valve to close said second switch to complete said electrical circuit to energize said solenoid to actuate said solenoid check valve to permit fluid in said closed circuit to flow toward said set of brakes, said solenoid check valve preventing fluid in said closed circuit from flowing from said set of brakes to said power unit until said first switch de-energized said electrical circuit.

22. An accelerator brake control consisting of an engine manifold provided with a vacuum, a control valve, an emergency valve, a check valve, a solenoid check valve, and a power unit comprising a housing, a hydraulic fluid cylinder former in said housing, said housing having a chamber, a first piston separating said chamber into a vacuum side and an atmospheric pressure side, said first piston extending into said hydraulic fluid chamber, a fluid conduit connecting said solenoid check valve with said hydraulic fluid cylinder, said control valve selectively permitting passage of atmospheric air into the pressure side of said chamber and selectively permitting a vacuum condition to be present in said atmospheric pressure side, a conduit provided with said check valve connecting said engine manifold with said vacuum side, said emergency valve comprising a chamber, a diaphragm dividing said chamber into a vacuum side and an atmospheric pressure side, a second piston secured to said diaphragm slidably mounted in said atmospheric pressure side, a spring urging said second piston and diaphragm toward said pressure side, a plate of electrical conductivity and electrically insulated from said second piston, secured to said second piston, electrical terminals fixed to said emergency valve, engageable and disengageable with said plate, an electrical circuit having a source of electrical power, comprising a switch, the solenoid of said solenoid valve and said terminals, a second conduit connecting said engine manifold with said vacuum side of said emergency valve, a third conduit leading from said solenoid check valve, said control valve in one selected position permitting vacuum from said engine manifold to be present in said vacuum side of said power unit and atmospheric pressure in said atmospheric pressure side of said power unit to move said first piston to force hydraulic fluid from said hydraulic fluid chamber through said solenoid check valve into said third conduit, said control valve in another selected position permitting atmospheric pressure to be present in both said vacuum side and atmospheric pressure side of said power unit, a spring in said vacuum side urging said first piston toward said atmospheric pressure side, said check valve operatively preventing atmospheric pressure in said vacuum side from reaching said manifold, upon vacuum failure in said engine manifold with said electrical circuit energized, said spring will urge said diaphragm and said second piston forward to engage said plate with said terminals to cause said solenoid check valve to block fluid from said third conduit from entering said solenoid check valve but allowing fluid from said hydraulic fluid cylinder to pass through said fluid conduit to said solenoid check valve into said third conduit, upon de-energizing said electrical circuit, said solenoid check valve remains in position to block passage of fluid from said third conduit until said first piston is actuated to force fluid from said hydraulic fluid chamber into said solenoid check valve with the solenoid de-energized.

References Cited in the file of this patent
UNITED STATES PATENTS

| | | |
|---|---|---|
| 2,026,163 | Drake | Dec. 31, 1935 |
| 2,079,978 | Weiss | May 11, 1937 |
| 2,464,327 | Mack | Mar. 15, 1949 |
| 2,626,026 | Sherwood et al. | Jan. 30, 1953 |